April 1, 1924.  1,489,171
D. M. SUSI ET AL
POTATO HARVESTER
Filed Aug. 5, 1920
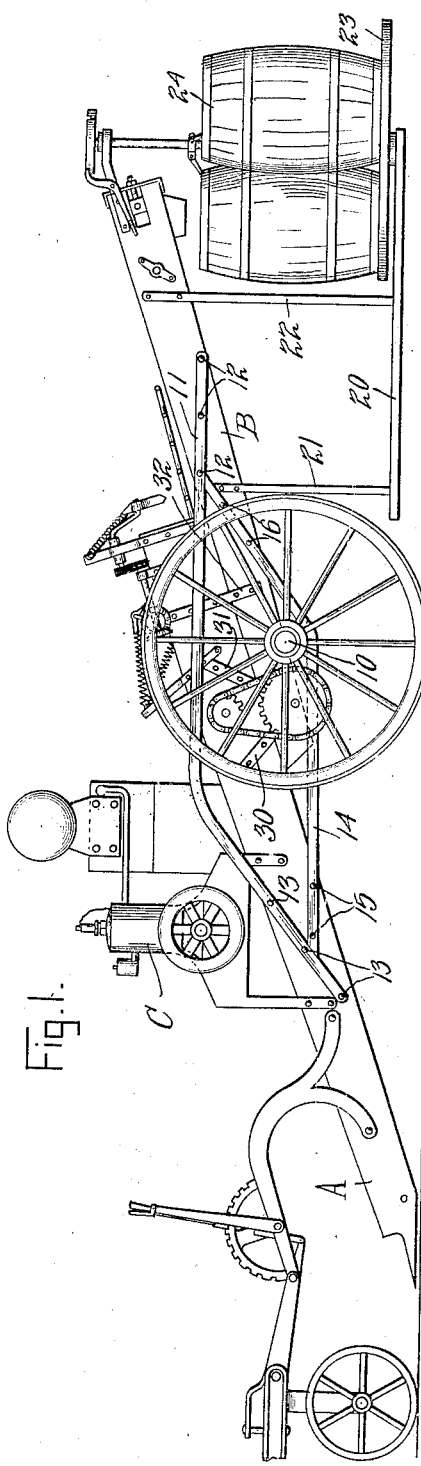
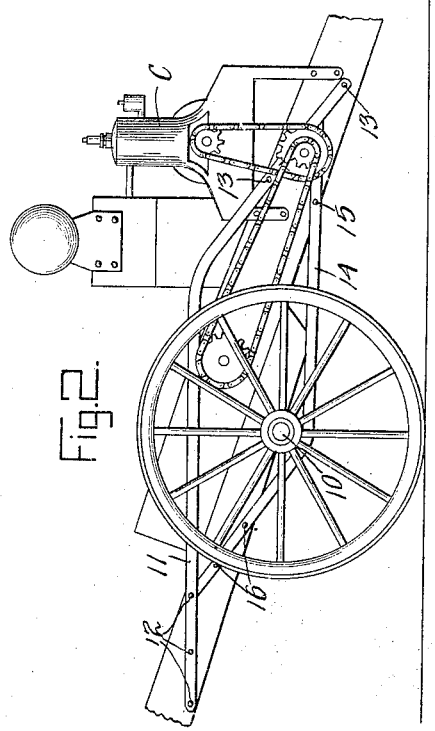
Inventors
Dominick M. Susi
Nathaniel H. Barrows
Attorney Patented Apr. 1, 1924.

1,489,171

UNITED STATES PATENT OFFICE.

DOMINICK M. SUSI AND NATHANIEL H. BARROWS, OF WATERVILLE, MAINE.

POTATO HARVESTER.

Application filed August 5, 1920. Serial No. 401,303.

*To all whom it may concern:*

Be it known that we, DOMINICK M. SUSI and NATHANIEL H. BARROWS, said Susi a citizen of Italy and said Barrows a citizen of the United States, both residing at Waterville, in the county of Kennebec and State of Maine, have invented certain new and useful Improvements in Potato Harvesters, of which the following is a specification.

Our said invention consists in certain improvements in the details of construction and arrangement of parts of potato harvesters, particularly the type of potato harvester forming the subject matter of application No. 360,091 filed February 20, 1920, by G. W. Wiseman, whereby the use of a truck for supporting the barrels and rear end of the picker is obviated and the picker and its entire load are supported and carried by the digger truck, all as will be hereinafter more fully described and claimed.

Referring to the accompanying drawings, which are made a part hereof and on which similar reference characters indicate similar parts, Figure 1 is a side elevation of a potato harvester constructed in accordance with our said invention, and Figure 2 a view of the reverse side at the point of the connection between the digger and the picker.

In said drawings, the portions marked A represent the digger, B the picker, and C an engine for driving the apparatus, the several parts being in themselves, in the main, of the Wiseman construction.

The frame of the picker B is supported directly upon the axle 10 of the main supporting truck and the frame of the digger A overlaps the frame of the picker B for a considerable distance and is supported directly upon the upper edge thereof and secured thereto by cleats or bars 30, 31 and 32 extending across the joint and secured to each. We also provide brace bars 11 secured by bolts 12 to the sides of picker B which brace bars extend in a horizontal direction to a point in front of the axle 10 where they curve downwardly and extend at an angle alongside the side bars of the digger A, to which they are secured by bolts 13. Other brace bars 14 are secured by bolts 15 to the sides of picker A and extend in a horizontal direction underneath the axle A to a point in the rear thereof where they extend upwardly at an angle alongside the side bars of the frame of picker B to which they are secured by bolts 16.

Said brace bars 11 and 14 being of stiff material, preferably steel, so joint the picker B to the digger A that the truck composed of axle 10 and the wheels thereon, are enabled to carry the entire load of the picker without the truck heretofore used under the rear end and as illustrated in said Wiseman application. The running-board or platform 20 on which the operator stands is supported by hangers 21 and 22 from the side of picker B and the rotary platform 23 carrying the barrels 24 is likewise supported on platform 20, all being carried, through the connection described, upon a single truck, thus obviating the expense of the additional supporting truck and the inconvenience incident to its use.

Having thus fully described our said invention, what we claim as new and desire to secure by Letters Patent, is—

1. In a potato harvester, the combination of a digger and a picker both mounted upon a single truck, the frame of the picker and the frame of the digger being supported one upon the other and secured together immediately above the support on said truck, and brace bars extending from a point to the rear of the axle of the truck to a point in front of the axle and both above and below the axle and securely bolted at one end to the digger and at the other end to the picker, substantially as set forth.

2. In a potato harvester, the combination of a digger and a picker, both mounted upon a single truck and supported one upon the other and rigidly secured together, substantially as set forth.

3. In a potato harvester, the combination of a digger and a picker both mounted and supported upon a single truck and one mounted and supported upon the other, and brace bars extending across the joint between the two and from one side of the truck axle to the other and secured to both, substantially as set forth.

In witness whereof, we have hereunto set our hands and seals at Waterville, Maine, this thirteenth day of July, A. D. nineteen hundred and twenty.

DOMINICK M. SUSI. [L. S.]
NATHANIEL H. BARROWS. [L. S.]

Witnesses:
 THOMAS N. WEEKS,
 KATHERINE C. WEEKS.